United States Patent [19]
Durham

[11] Patent Number: 5,809,844
[45] Date of Patent: Sep. 22, 1998

[54] SPACING RING FOR BICYCLE CHAINRINGS

[76] Inventor: Roger O. Durham, 1370 Thompson Ave., Glendale, Calif. 91201

[21] Appl. No.: 741,051

[22] Filed: Oct. 30, 1996

[51] Int. Cl.$^6$ .................................................. G05G 1/14
[52] U.S. Cl. ...................... 74/534.1; 74/534.2; 474/160; 403/DIG. 7
[58] Field of Search ................... 74/594.1–594.6; 474/160; 403/DIG. 7

[56] References Cited

U.S. PATENT DOCUMENTS

| | | | |
|---|---|---|---|
| 3,835,729 | 9/1974 | Tarutani | 74/594.2 |
| 4,102,215 | 7/1978 | Nagano et al. | 74/594.1 |
| 4,311,473 | 1/1982 | Sugimoto | 474/160 |
| 4,361,972 | 12/1982 | Miller | 74/594.6 X |
| 4,425,824 | 1/1984 | Koch | 74/594.2 |
| 4,639,241 | 1/1987 | Monka | 474/902 |
| 5,003,840 | 4/1991 | Hinschlager | 74/594.2 |
| 5,242,028 | 9/1993 | Murphy et al. | 74/594.1 X |
| 5,246,402 | 9/1993 | Romano | 74/594.2 X |
| 5,560,266 | 10/1996 | Shikimori et al. | 74/594.1 |

FOREIGN PATENT DOCUMENTS 2441533  6/1980  France .................. 74/594.2

*Primary Examiner*—Vinh T. Luong

[57] ABSTRACT

A cylindrical spacing ring spaces apart bicycle chainrings. The cylindrical spacing ring preferably encompasses a plurality of threaded fasteners which secure the chainrings to a bicycle crankarm means.

2 Claims, 1 Drawing Sheet

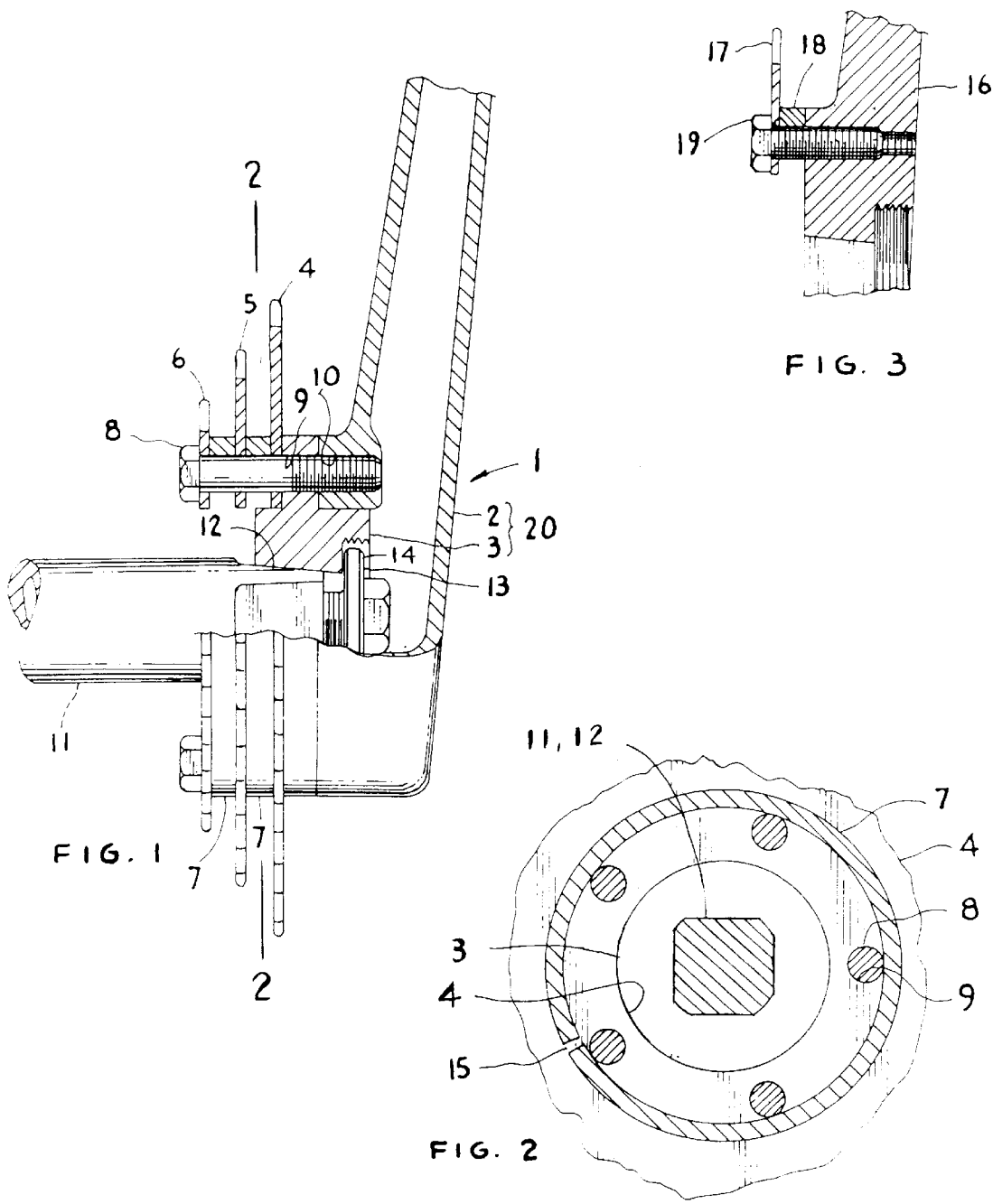

SPACING RING FOR BICYCLE CHAINRINGS

CROSS REFERENCES TO RELATED APPLICATIONS

"My patent application, Ser. No. 08,456,185, filed May 31, 1995, and issued on Apr. 29. 1997 as U.S. Pat. No. 5,623,856, entitled BICYCLE CRANKARM WITH INTERNAL FLANGE shows a crank arm such as that depicted in this application. Also, Ser. No. 08/739,716, filed Oct. 29, 1996, and entitled CRANKARM HUB FOR BICYCLE CRANKSHAFTS is herein shown".

BACKGROUND OF THE INVENTION

A) Field of the Invention

This invention pertains to bicycle crankshafts which include a crankarm means which mount one or more chainrings by a plurality of threaded fasteners, and wherein at least one chainring is spaced away from either another chainring, or away from the crankarm means, by one or more spacers.

B) Description of the Prior Art

In the past, chainrings have been mounted by a plurality of threaded fasteners and they have been spaced apart by thick washers which encompassed each individual fastener. There are several problems with such an arrangement:

1. It is time consuming, tedious, and somewhat difficult to locate the light, loose washers between the chainrings then pass the fasteners through. The washers do not stay in position very well, particularly if there are three chainrings to be thus assembled to a crankarm means.
2. The resulting assembly of chainrings, washers, and fasteners has many inaccessible surfaces, and is difficult to clean.
3. Such assemblies present a cluttered appearance.

SUMMARY OF THE INVENTION

According to the invention, cylindrical spacing rings are provided to space apart bicycle chainrings which are mounted to a bicycle crankarm means by a plurality of threaded fasteners. The spacing rings encompass the threaded fasteners. The spacing rings may have a gap in them.

BRIEF DESCRIPTION OF THE DRAWINGS

FIG. 1 shows a side elevation and partial section of a bicycle crankshaft, crankarm means, chainrings, and spacing rings according to the invention.

FIG. 2 is a section taken along line 2—2 of FIG. 1, showing the spacing ring and other elements of the crankarm means.

FIG. 3 shows a partial section wherein a spacer ring is used to space a chainring away from a crankarm means, which in this case is a solid crank arm.

DETAILED DESCRIPTION OF THE DRAWING

Referring to FIG. 1, a portion of a bicycle crankshaft 1 is shown to include a crankarm 2 and a crankarm hub 3, which are parts of a crankarm means 20, a plurality of chainrings 4, 5, and 6, which are spaced apart by a plurality of cylindrical spacing rings 7, and secured to said crankarm means 20 by a plurality of threaded fasteners 8, which pass through holes in said chainrings 4, 5, and 6, pass through a plurality of holes 9 in said crankarm hub 3, and engage a plurality of threaded holes 10 in said crankarm means 20. Said crankarm hub 3 is secured to the end of a crankshaft spindle 11 by a four-sided taper 12 and held in place by a fixing bolt 13 which has a flange 14.

In FIG. 2, said spacing ring 7 is shown to encompass and be positioned by said threaded fasteners 8. A gap 15 is shown in said spacing ring 7.

In FIG. 3, a solid crankarm means 16 is shown, to which a single chainring 17 is secured by a plurality of threaded fasteners 19 which pass through holes is said chainring 17, through a spacing ring 18, and engage threaded holes in said solid crank arm means 16. FIG. 3 shows a second embodiment of the invention.

MODE OF OPERATION

The cylindrical spacing rings 7 are located between the chainrings 4, 5, and 6 and serve to space them apart. The threaded fasteners 8 position the spacing rings 7 and secure the chainrings 4, 5, and 6, the spacing rings 7, and the crankarm 2 to the crankarm hub 3 of the crankarm means 20.

The spacing rings 7 present a clean appearance to the assembly, and are they are relatively easy to keep clean.

The gap 15 serves two purposes: It allows for minor differences in size of the spacing ring 7 and threaded fasteners 8, and it also allows for minor differences in the location of the threaded fasteners 8. It also allows water to drain from within.

I claim:

1. In a bicycle crankshaft including a crankarm means to which a plurality of chainrings are secured by a plurality of threaded fasteners, I claim at least one spacing ring disposed between said chainrings wherein said spacing ring encompasses said threaded fasteners.

2. Apparatus according to claim 1, wherein said spacing ring has a gap.

* * * * *